United States Patent [19]
Krause et al.

[11] Patent Number: 5,907,850
[45] Date of Patent: *May 25, 1999

[54] METHOD AND SYSTEM FOR MANIPULATING CONSTRUCTION BLUEPRINT DOCUMENTS WITH HYPERMEDIA HOTSPOT REFERENCE LINKS FROM A FIRST CONSTRUCTION DOCUMENT TO A RELATED SECONDARY CONSTRUCTION DOCUMENT

[75] Inventors: Gary Matthew Krause, 4429 Orion Rd., Lake Orion, Mich. 48035; Brent E. Marrow, Upland, Ind.

[73] Assignee: Gary Matthew Krause, Lake Orion, Mich.

[*] Notice: This patent is subject to a terminal disclaimer.

[21] Appl. No.: 08/785,561

[22] Filed: Jan. 21, 1997

Related U.S. Application Data

[62] Division of application No. 08/363,689, Dec. 23, 1994, Pat. No. 5,625,827.

[51] Int. Cl.[6] ................................................. G06F 17/50
[52] U.S. Cl. ............................................. 707/501; 345/357
[58] Field of Search .......................... 707/501; 345/435, 345/173, 502, 116, 418, 357

[56] References Cited

U.S. PATENT DOCUMENTS

| 4,692,757 | 9/1987 | Tsuhara et al. | 345/116 |
| 4,716,542 | 12/1987 | Peltz et al. | 345/173 |
| 5,204,947 | 4/1993 | Bernstein et al. | 345/357 |
| 5,315,700 | 5/1994 | Johnston et al. | 345/502 |
| 5,353,393 | 10/1994 | Bennett et al. | 345/435 |
| 5,526,520 | 6/1996 | Krause | 707/501 |

Primary Examiner—Joseph H. Feild
Assistant Examiner—John L. Young
Attorney, Agent, or Firm—Howard & Howard

[57] ABSTRACT

A system (10) allows the storing of construction drawings or blueprints in a plurality of computer files (32). The system (10) allows automatic determinations of lengths, areas and count of dimensions displayed in drawings. The measured dimensions are provided in terms of real world or full scale quantities. A scale between the full scale quantities and computer displayed dimensions is determined for each file (32) to allow subsequent measurements scaled in terms of the original blueprint designated dimensions. The dimensions are identified with particular product items so that a quantity of items and costs thereof may be automatically determined and reported.

12 Claims, 8 Drawing Sheets

METHOD AND SYSTEM FOR MANIPULATING CONSTRUCTION BLUEPRINT DOCUMENTS WITH HYPERMEDIA HOTSPOT REFERENCE LINKS FROM A FIRST CONSTRUCTION DOCUMENT TO A RELATED SECONDARY CONSTRUCTION DOCUMENT

This is a divisional of application Ser. No. 08/363,689 filed on Dec. 23, 1994 U.S. Pat. No. 5,625,827 issued: Apr. 29, 1997.

TECHNICAL FIELD

The invention relates to a computer based system and method for processing and manipulating building plans or blueprint drawings.

BACKGROUND OF THE INVENTION

It is common in the industry of building construction, that architects or other design personnel draw up construction blueprints or plans either by hand or on a computer aided design (CAD) system. Such blueprints or working drawings include a general or primary plan drawing with supporting pages of detailed, secondary drawings supplementing and referencing the primary building drawing, i.e., floor plans, sectional, etc., along with supporting textual specifications. The detailed drawings provide more specific information for various portions or areas from the primary plan drawing. For bidding and estimating on a project, a single company distributes rolls of microfiche of the blueprint drawings or building plans in their entirety. Selective drawings of specified plans on the microfiche are then viewed to provide estimate proposals thereon. Though a contractor may be interested in only one particular portion of the building, the contractor must search through all the plans in order obtain the drawings for the particular portion. Obviously, this type of system provides for difficulty in handling the drawing and consumption of time in flipping through all the drawings.

It has been known in the art to input information into a computer for cost estimating analysis and reporting. Common computer systems may provide costs of material and provide reports thereof based on construction information specifically put into the computer. An example of such capability is illustrated in U.S. Pat. No. 5,189,606, issued Feb. 23, 1993 in the name of Burns et al.

U.S. Pat. No. 4,964,060, issued Oct. 16, 1990 in the name of Hartsog discloses a building test system which reviews building plans in view of required standards, such as zoning codes and regulations. U.S. Pat. No. 4,885,694, issued Dec. 5, 1989 in the name of Pray et al discloses an automated building control design system. The system is a computer base system for substantially automating the designs of a building control system, such as electronics, heating, etc.

Other patents using graphics include the following. U.S. Pat. No. 5,255,207, issued to Cornwell discloses a method for designing and detailing cabinets which allow a user to design cabinet structure by standard cabinet designs and to modify or override standard designs as desired. The program also allows the cost of the materials of the cabinets to be produced based on the design. U.S. Pat. No. 5,111,392, issued to Malin discloses a system for creating furniture layouts which utilizes standard furniture pieces. The finish, color and fabric may be separately determined for the furniture layout and pieces. Cost and bill of materials may be automatically produced based on the designed layout. U.S. Pat. No. 5,299,307 to Young discloses a method of manipulating objects as to their size, dimension, location and positioning on the computer. U.S. Pat. No. 5,319,541 issued to Blanchard et al discloses a computer for aiding in the selection of roof systems and the specifications therefore. The roofing system is selected from various data entered by the user and specifications are generated based on by applying a matrix. The prior art failed to disclose utilization of architectural blueprint drawings which are input into the system with a dimension or scale associated therewith, and take off is obtained therefrom simply by manipulation thereof in order to subsequently associate quantity of material and pricing therewith.

None of the prior art systems allow the manipulation of blueprint drawing plans in existence by automatically and electronically viewing the drawing and allowing calculation of measurements and quality totals of parts.

SUMMARY OF THE INVENTION

The invention includes a method for manipulating a plurality of document files including construction building drawings. The method includes the steps of: storing a plurality of document files including drawings having full scale dimensions thereon in computer memory; selectively displaying a drawing; electronically selecting at least two measuring points on the drawing; and automatically determining a measured quantity represented by the measuring points scaled to the full scale dimensions.

Also included is a method including the steps of: storing a plurality of document files including drawings having full scale dimensions indicated thereon in computer memory; selectively displaying a graphic drawing stored in computer memory; selecting at least two scale points along the drawing establishing a line; inputing a scale quantity identifying a full scale dimension represented by the length of the line between the two scale points; and determining a scale associating the scale quantity with the length of line in the computer display.

BRIEF DESCRIPTION OF THE DRAWINGS

Advantages of the present invention will be readily appreciated as the same becomes better understood by reference to the following detailed description when considered in connection with the accompanying drawings wherein.

DESCRIPTION OF THE PREFERRED EMBODIMENT

Figure 1:
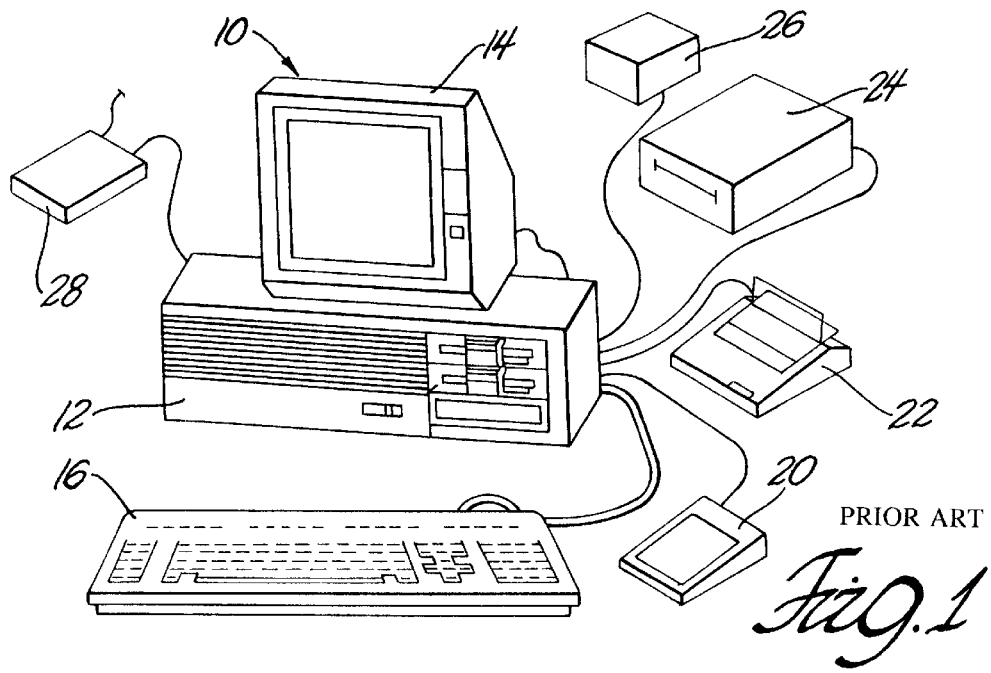
FIG. 1 is a block diagram of the system of the subject invention.

An electronic filing and manipulation system is generally illustrated at 10 in FIG. 1. The system 10 includes a controller means 12 with display means 14 and selection means 16. The display means 14 generally comprises a CRT monitor as commonly known in the art. The selection means 16 comprises a standard computer keyboard 18 and a remote control mouse 20, both connected to the computer 12 as known in the art. The selection means 16 allows for input of information and selection of functions as subsequently discussed. The controller means 12 may be comprised of a typical computer. It is to be understood that other types of equivalent components may be utilized, such a pen sensitive display in place of a CRT unit.

The filing system 10 also includes auxiliary components which may be attached in typical computer fashion. Such auxiliary components may include a printer 22, scanner 24, and a video/audio player 26. The auxiliary components may also include an external communication device 28, typically a modem or other communication device, for communicating with other computers or auxiliary devices.

In the preferred embodiment, the invention relates to the manipulation of building designs or blueprint drawings with the overview or general elevational plan drawing herein referred to as the "primary document" and the detail drawings supporting that primary document entitled the "secondary documents". Typically, the sets of blueprint drawings include graphic drawings with text supporting same and specifications. It is to be understood that the invention may be applicable to other types of systems with various documents.

The blueprint drawings are either scanned in by the scanner 24 or copied electronically. The drawings copied electronically may be communicated through the modem 28 or external device, or by copying a computer disk by disk drive 29. Furthermore, the system 10 is capable of receiving CAD drawings either by modem 28 or electronic copying, or software creations within the computer 12. The system 10 includes translation means 31 for receiving the blueprint drawings in any electronic form described above, i.e., from various operating systems, and for converting same into useable form for the subject system 10. The subject system 10 may operate in any of the following operating systems, or any other system: Unix™, OS/2™, Windows™, Windows NT™, etc. The translation means 31 includes software generally available to convert document formulas between programs and operating systems. The subject system 10 is based on the Windows Multiple Document Interface (MDI), which allows for simple displaying, tiling, cascading, and minimizing of multiple images. The system 10 is able to display and manipulate for all raster files, including ".TIF", ".BMP", and ".PCX" formats. In addition, the system 10 can display and manipulate faster files, such as the common CAD ".DWG", ".DXF" files, as well as HPGL files.

The controller means 12 includes input means 33 for receiving input from the keyboard 16 and mouse 20 to communicate and operate the necessary commands. The controller means 12 also includes output means 35 for formulating the display output to the printer 22, modem 28, and video/audio player 26. The input 33 and output 35 means are generally standard computer components which allows communication of signals in various forms between equipment.

The controller means 12 includes processor means 13 for performing the necessary operations and functions in conjunction with the external devices, and communicates with the input 33 and output 35 means, as subsequently discussed. The processor means 12 comprises a typical computer processor which operates with a software program stored in memory 30, as subsequently defined and discussed.

The controller means 12 includes memory means 30 for storing a plurality of documents in a plurality of files 32. The documents may comprise the blueprint graphic drawings, text information, and instructional information as subsequently discussed. In the preferred embodiment, each page of the standard blueprint drawings is equivalent to a page or software file 32 in the memory 30. Therefore, each page is electronically transferred into the memory 30 as an individual file. In conjunction with the processor means 13, the documents are stored in memory 30 in the typical manner. A program memory 27 stores the software program for the processor means 13. It is typical that a detail page may have two or more detailed graphic drawings thereon, which will be uniquely handled, though the entire page is stored as a single file 32.

Each page file 32 within the memory means 30 may include a plurality of documents therein, i.e., several individual drawings. Each document may be independently identified. The processor 13 includes framing means 34 for electronically identifying a selected document from a page file having a plurality of documents, and separately identifying same as a separate file. For example, a blueprint page file may have several detail drawings thereon. The framing means 34 allows an operator to designate a specific drawing as a frame 36 and create a frame file therefor.

More specifically, the framing means 34 allows the page file to be displayed on the display means 14, and use of either the keyboard 16 or the mouse 20 (cursor) allows the user to block a particular document or drawing therein. The operator graphically clicks or actuates with the mouse 20 and moves same to move the cursor about a desired drawing or frame on the page file which indicates same as the selected frame 36.

Naming means 38 allows the selected frame 36 to be specifically identified by a name as a file, which is then stored in memory 30. Upon the selection of a frame 36 within a page file, the operator inputs a frame name therefore and the naming means 38 will create a new file in memory 30 with the frame name. The frame file will include the coordinates of the frame 36, and the name of the page file in which it is contained. Further information may be associated therewith.

Figure 6:
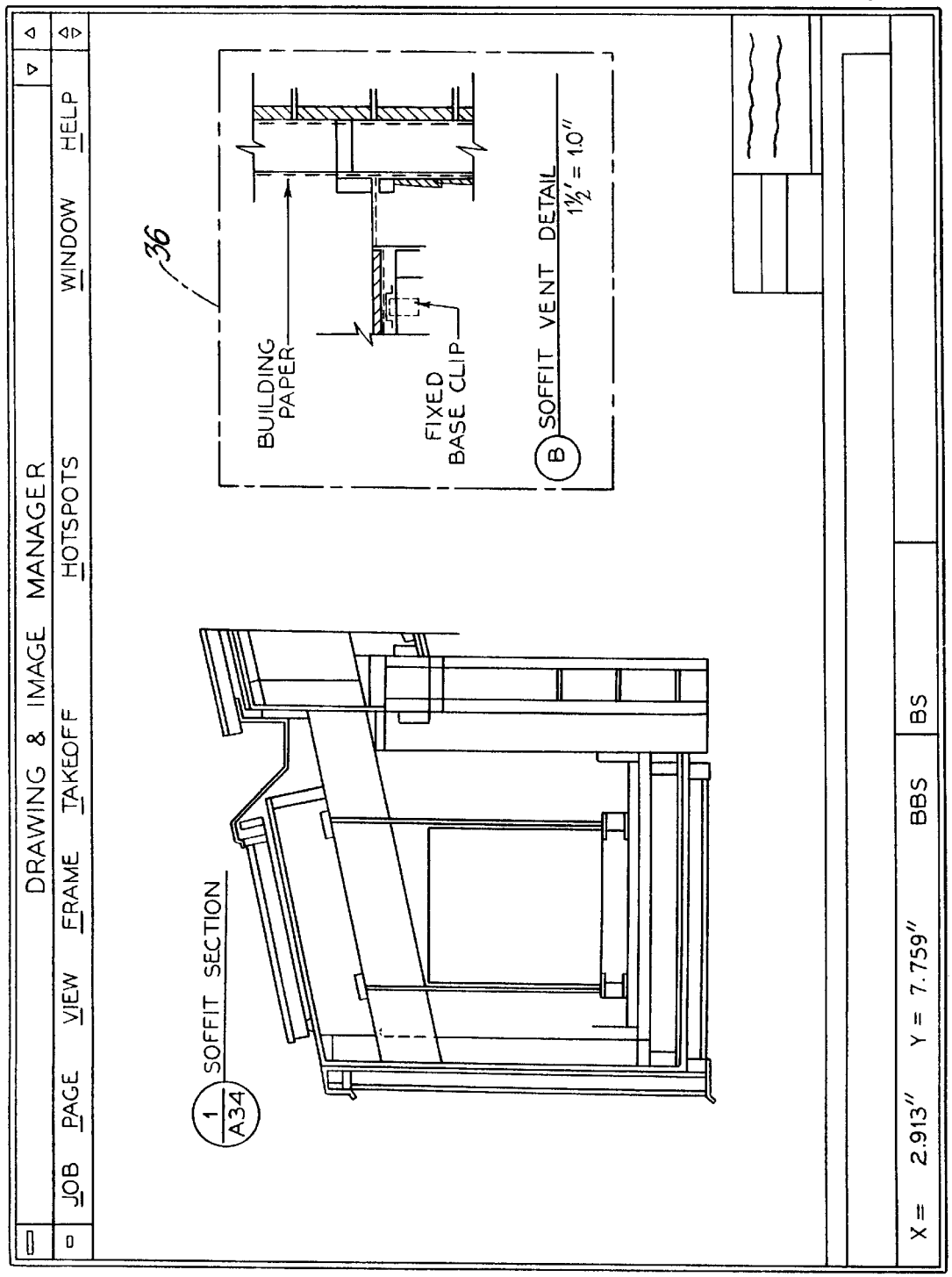
FIG. 6 illustrates a display of a secondary document file with framing.

The processor 13 includes scaling means 40 for storing information regarding the measurement scale of the selected frame 36 for each frame file 32, or each file as a whole as desired. In other words, once the frame 36 within a page file is created, a specified scale may be associated therewith, which may be different from any other frame or drawing on that particular page file. Each frame 36 on a page or in a file will have its own scale identifiers which is also stored in the frame file (FIG. 6). The frame file may store the actual document or drawing. Alternatively, the frame file may store the page file and coordinates of the frame.

Other types of files may be created and stored with a project. Such files include text files and audio/video files. The primary document may include text information thereon. Additional text information may be entered in a text file, which can be accessed by the primary document with hotspots as subsequently discussed. A hotspot may activate an audio/video function which, when activated, actuate the audio/video device 26 to either play an audio or video which provides further detailed information. The audio/video files and functions are commonly known in the art.

The processor 13 also includes correlating means 44 for identifying a hotspot or point on a document, and calling up a secondary document from the memory means 30 associated with the hotspot to provide further information to the operator. In other words, on the primary document, a hotspot may be indicated thereon which will identify different information or a drawing, i.e., a sectional, end view, or text, etc. A reference indicator 46 as the hotspot is placed on the primary document which references the secondary document and can automatically call-up a page or frame file, or other type of file for display or execution (video/audio).

More specifically, the correlating means 44 includes indicating means 48 for placing a visual indicator 55 on the primary document as the hotspot. In other words, the operator can cause to be placed the visual indicator 55 at any location on a document for association with a secondary document in order to provide additional detail information therefor. The visual indicator 55 generally includes a name which is a name of a secondary file within a symbol.

The indicating means 48 includes labeling means 50 which places a name and label at the hotspot 55 which identifies the secondary document by file name. It is to be further understood that a secondary or detail document may act as the primary document so that it may include a hotspot 55 which references a different secondary document for call-up.

The indicating means 48 also includes linking means 52 for displaying the secondary document when the hotspot 55 is activated. Activation of a hotspot 55 occurs by clicking or actuating the hotspot 55 by the mouse/cursor 20, or using the keyboard 16 with cursor/enter. The linking means 52 accesses the name of the secondary document in the hotspot 55 to call up the secondary document. The secondary file is identified by the name in the hotspot 55, and the processor means 13 automatically displays the secondary document upon activation of the hotspot 55. It is to be understood that the secondary document may be comprised of either graphic drawings or text, or may cause other external devices to be activated. The secondary document identified by the hotspot 55 is placed on top of the primary, calling document on the display screen 14, as subsequently discussed.

In order to limit the number of working files referenced and accessed at a time, the system 10 includes project selection means 56 for storing a project or job with text information and selected blueprints or drawings therefore. In other words, a user may select a limited number of specific blueprint drawing files to be used in and associated with a project such that when selecting a project, only certain files will be used therewith. The memory means 32 includes a project memory 58 for storing each separate project therein by project name. The project memory 58 will be comprised of at least a primary document and several secondary documents referenced by file name, along with any other types of documents as desired by the operator.

Also included in the processor means 13 is a quantitative means 60 for providing the approximate dimensions of a blueprint drawing, and for providing a quantity of materials necessary for constructing same. The mouse 20 or cursor is utilized to outline the perimeter of an area or shape of the building in the drawing. Thereafter, the quantitative means 60 will calculate the size and dimensions of the outlined area dependent on the scale associated therewith. This information may be saved in memory and is displayed on the display 14. From this information, pricing and materials may be determined.

In addition to the above described features, pricing and reporting may be accomplished by software, as commonly known in the art.

Figure 5:
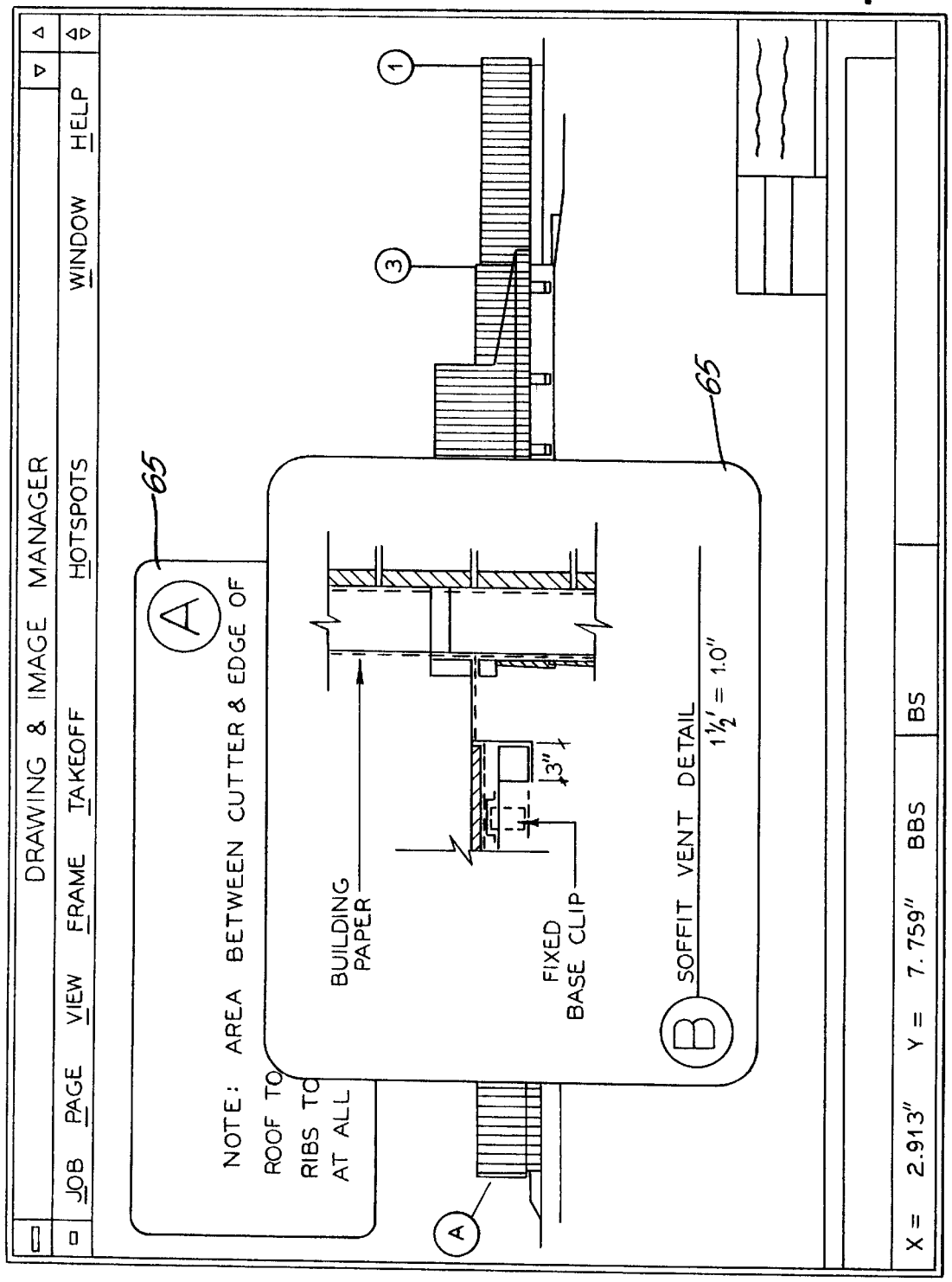
FIG. 5 illustrates the display of a primary document including secondary documents in windows.

The processing means 13 includes stacking means 64 for displaying the primary documents fully on the screen 14 with any secondary documents stacked in cascade manner on top thereof upon activation of the hotspots 55. In other words, when the primary document is first called up by the operator, the primary document is displayed on the entire screen 14. However, when a hotspot 55 is activated, the linked or secondary document is displayed in a window 65 over the primary document, generally in a less than full view, as illustrated in FIG. 5. The secondary document may thereafter be exited in order to have the original, primary document again fully displayed without any windows thereover. Hot spots need not be utilized, and in such case, the user may merely select a new file from the file list which may be displayed by itself, or in tile or cascaded manner. Multiple windows 65 may be stacked in cascade manner. Alternatively, the windows 65 may be placed in a "tile" configuration, as commonly known in the art.

The processor means 13 also includes function means 66 for displaying a tool or function bar 70 across the top of the display screen 14 to allow various functions to be performed by the operator. Such functions may include the following: JOB, PAGE, VIEW, FRAME, TAKE-OFF, HotspotS, WINDOW. Any other types of functions may be added to provide for additional features of the invention. The JOB function allows the association of the files with a job or project. The PAGE function allows the identification of pages to be identified with a project. The VIEW function allows change in the view which is presently displayed on the screen 14. The FRAME function allows framing or identification of a single drawing or document on a multiple drawing page. The TAKE-OFF function allows for a drawing to be quantitized. The Hotspot function allows for the creation and modification of hotspots. The WINDOW function allows for windows showing secondary documents to be varied. The functions will be more specifically defined in the following description of the method of the subject invention. Activation of a function is commonly known in the art.

Figure 3A:
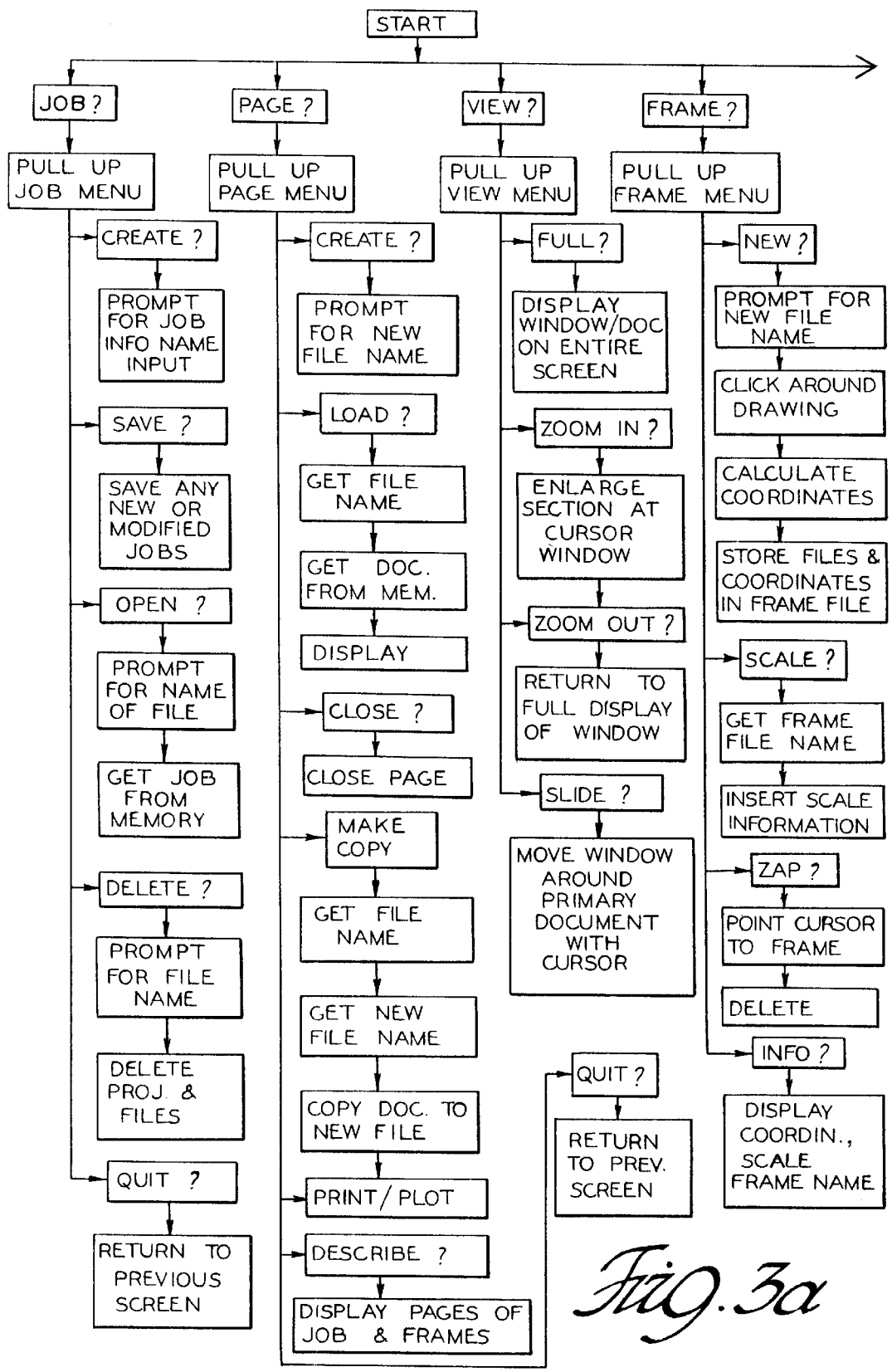
FIGS. 3 a–b area flow chart of the controller.
Figure 3B:
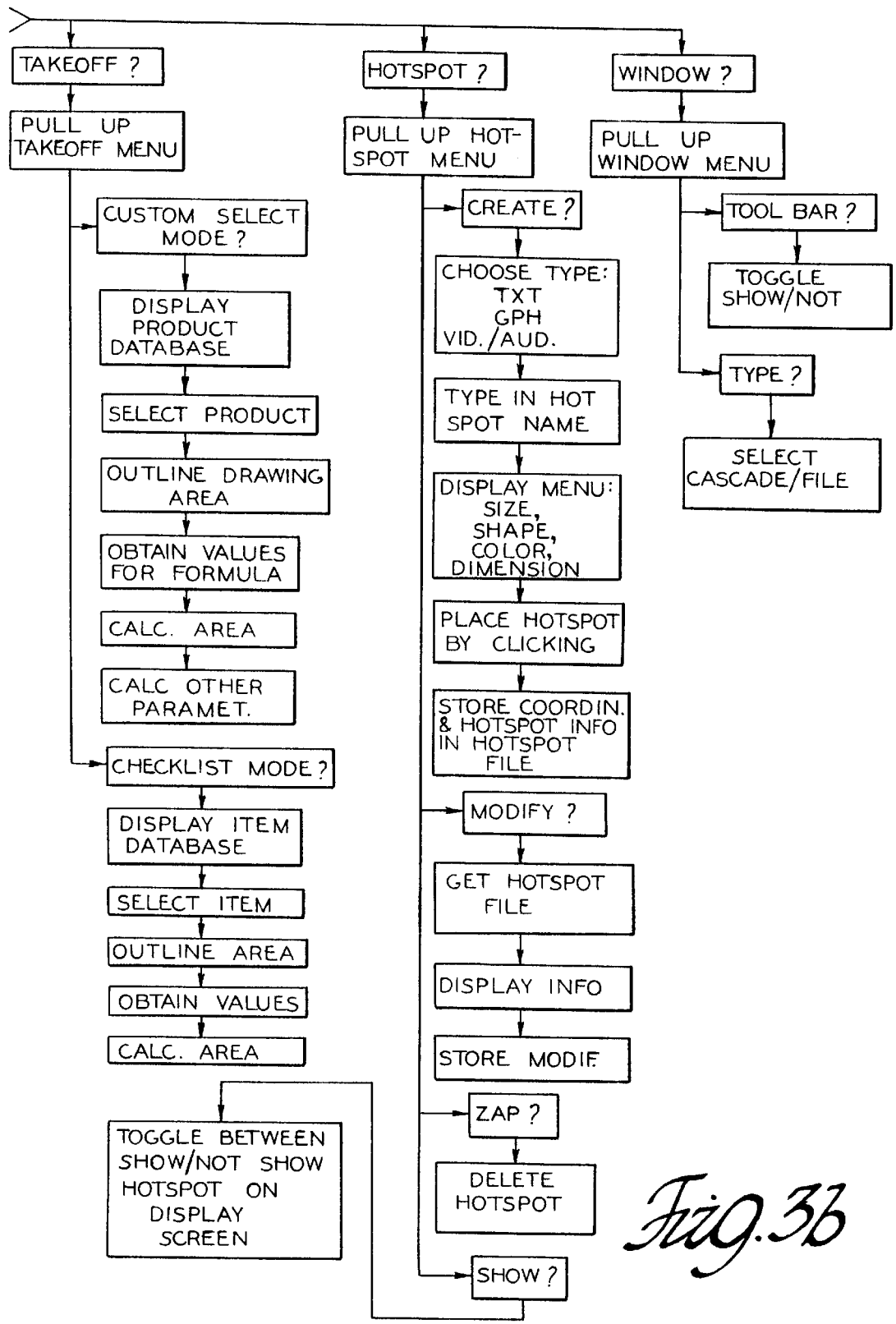

The method of organizing a plurality of documents including graphic drawings is outlined in the flowchart of FIGS. 3 a–b and implemented by a software program stored in the program memory 27.

The documents for blueprint images are stored in the files 32 of the memory 30. The blueprint images may be either scanned in or copied electronically either by disk drive 29 or modem 28. Alternatively, a CAD file may be utilized to provide the electronic blueprint drawings directly on the system 10 or copied. Each hard-copy of the blueprint drawing sheets or pages is copied as a separate file 32 in memory 30, and may be named as indicated on the page.

Thereafter, a project is initiated and a job file is created by actuating the JOB function. The job file in project memory 58 holds all information about a job, including its geometric model, page layouts, price reports, etc. The job file consists of the job name; description of the job; client information including name of the contact person, phone number and address; contract information including name, contact person, phone number and address; job date; industry; page description for containing a description for each page of the job; etc. These items may not be included in the job file but may reference other, separate files while the job file only holds the file name.

When the JOB function is executed, a window menu is displayed on the screen 14 which displays the subfunctions: OPEN, CREATE, SAVE, DELETE and QUIT. When the OPEN subfunction is activated, the operator is prompted to type in an existing project name so that the system 10 will be operating therein. When the CREATE function is executed, a menu is displayed which allows for a new project name to be entered and project information thereafter. When the DELETE function is executed, the name of the project is requested and is thereafter be deleted with all associated files. The SAVE function saves the job entered with the CREATE or OPEN subfunctions, and any changes made therein. The QUIT subfunction quits the job menu. Other functions may be utilized in combination with the JOB function including such common computer functions as move, rename, etc.

The PAGE function moves files and associates same with a project or job, or calls up a page for use. Once all of the blueprint drawings are entered, the operator may select blueprint drawings from a directory of all of the input files. Selected pages will be identified with the previously opened or created job. Either the actual files may be moved to a subdirectory for the project, or merely the identification of files may be associated with the project. In the preferred embodiment, the file names are included in the job file. Thereafter, this project information is saved.

The PAGE function when activated pulls up a menu which includes the following subfunctions: CREATE, LOAD, CLOSE, MAKE COPY, PRINT, PLOT, DESCRIBE, QUIT. The CREATE function will create a new file for a page. The LOAD function will load the page file which is input by the operator as the document displayed on the screen 14. The MAKE COPY will copy an existing page file and provide a new name for the new copy to be input for the project. The PRINT and PLOT functions will output the page file on the display 14 to the printer 22 or other external. The QUIT function puts the user back to the previous display screen. The DESCRIBE function pulls up textual information regarding a description of the job or project and files associated therewith, and allows same to be modified.

Frames may be created within the page files of the stored documents by using the FRAME function. The FRAME function includes the subfunctions of NEW, ZAP, SCALE, MOVE and INFO. First, a page is chosen for frame creation by the PAGE function. The NEW subfunction is activated which allows naming of a frame (frame file) and designation of a frame on the displayed page. The operator selects the area and clicks around the area with a mouse 20 to define the area of the frame 36. The coordinates thereof are calculated and stored in the frame file. The SCALE subfunction can be activated if a new scale must be added for the particular frame. The INFO subfunction allows you to click on a frame to display the information of scale, page, coordinates, etc. This process may be continued for any number of frames 36 within one page and with each page within a project. The ZAP subfunctions allows deleting a frame 36 by moving the cursor thereon.

Thereafter, hotspots 55 may be defined associated with particular page files or frame files, or any other type of file. In order to define a hotspot 55, a primary document is first selected by the PAGE function and displayed on the screen 14.

Thereafter, hotspots 55 may be placed on the primary document, the hotspots 55 being previously defined as either the page files or frame files, or any other type. The HOTSPOT function is activated. The HOTSPOT function when activated will pull a new menu onto the screen when lists the subfunctions: CREATE, MODIFY, ZAP, SHOW, ENABLE. The CREATE subfunctions allow creation of a new hotspot on the displayed document. The MODIFY function allow modification of an existing hotspot, i.e., moving to a different location, renaming, etc. The ZAP subfunction deletes a hotspot 55. The SHOW subfunction allows selection of whether or not to display the hotspots 55 on the screen 14.

Upon activation of the CREATE subfunction, a menu is displayed to allow selection of the type of document and file, i.e., text, graphic, audio, video. Once selected, the name or file of the hotspot 55 is input, the file name being previously defined and stored in memory 30 when creating the frame or naming the page. Thereafter, a menu for selection of the size, shape and color of the hotspot 55 is displayed to have the operator select the visual indication. Thereafter, the operator is prompted to place the hotspot 55 by moving the cursor and activating. Thereafter, additional hotspots 55 may be placed on the document. It is also to be understood that hotspots 55 may be placed on secondary documents which reference other secondary documents. Hotspots 55 which are entered on documents will be stored in a linked hotspot file so that upon display of the document, the hotspots 55 will be displayed when the SHOW is enabled.

With regard to the quantities of portions of the drawings, the TAKE OFF function is activated. The TAKE OFF function allows a defined perimeter or area of a building drawing in the file to be outlined for automatic calculation of the dimensions thereof, to be subsequently used to determine costs and material quantities. The information may be put into standard software packages which allow for costs analysis. The subject software provides information of dimensions to the cost analysis program.

Upon execution of the TAKE OFF function, a menu is displayed for selection of CUSTOM SELECT or CHECKLIST modes. In the CUSTOM SELECT mode, a product database is displayed for selection of a specific product. The product database is stored in memory 30 and provides a list of products by commercial name and costs, such as:

| | | |
|---|---|---|
| Paint — Doors and Frames | De Sota | $ 12.49 |
| Paint — Handrails | Lucile | 18.71 |
| Painting — Masonary — Low | Pittsburgh | 192.47 |
| Painting — Masonary — Medium | Pittsburgh | 63.00 |
| Paint — Windows | De Sota | 72.00 |
| Flexible Wood Veneer | Sherwin Williams | 36.00 |
| Special Coating | Sherwin Williams | 28.56 |
| Trim — Painted | Sherwin Williams | 881.00 |

Once a product is selected, then the take off is performed wherein the user outlines an area of the drawing. The outlining is performed by clicking from corner to corner with straight lines being automatically drawn between consecutive clicked corners. Once an area is closed, the program calculates the area based on the scale and displays and stores same in memory. Any values not provided from the takeoff or in memory will be prompted by a menu for input by the operator. For example, if the item of stud wall is selected, the file holds that the take off unit is linear feet and the takeoff formula is length×height×width. The values of height and width may be required to be input if unobtainable from the takeoff. The file for stud wall includes multiplication factors to be multiplied with the calculated area to provide additional information: labor productivity (×0.08), labor rate (×26.00) material conversion (×0.015), material unit (bd ft), material price (×97.00), waste % (×7.00), equipment productivity (×0.0628), equipment rate (×2.20), sales unit price, other unit price. The values may be adjusted based on a particular grade or manufacture of selected item or product. The quantity of the product and the approximate cost is also calculated from the selected product information.

In the CHECKLIST mode, a pre-configured item list is displayed for selection, i.e., roof, walls, floor, etc. Once an item is selected, takeoff may be performed as in the SELECT mode to outline the relevant area. The item will designate a formula for determining the dimensions thereof based on the information from the takeoff. If any information is necessary additional to that obtained from the drawing, a prompt for the information is displayed requesting input thereof. The formulas are the same as described in the previous mode, though include only average costs and material costs may be excluded. The operator is prompted to actuate the mouse 20 and move the cursor about the area for which dimensions are to be calculated. Once completed, the program calculates the dimensions in view of the assigned scale, and displays the information.

The screen function allows an operator to access the information presently displayed on the screen. The subfunctions include make copy, print, plot, describe, quit. The make copy subfunctions allows a copy to be made of the screen display and input into the file. The print allows the screen to be printed to a printer, as does the plot function. The describe functions allows for the description of that which is displayed on the screen which is stored in the file. The quit function allows the menu to be removed and go back to the general menu.

The VIEW function allows a frame or secondary document to be adjusted in dimension as an overlay or window 65 over the calling or primary document. The VIEW function includes the subfunctions of: FULL, ZOOM IN, ZOOM OUT, SLIDE. The FULL subfunction allows the secondary document to be displayed fully on the screen 14. The ZOOM IN subfunction allows an area of the document to be exploded in the window 65. The ZOOM OUT subfunction resumes the original window display. The SLIDE subfunction allows the window 65 to be moved in an overlay fashion anywhere about the primary document.

The memory means may store the project information in either optical, CD-ROM or magnetic media. Typically, any standard 386 computer systems may run the subject system 10.

Figure 4:
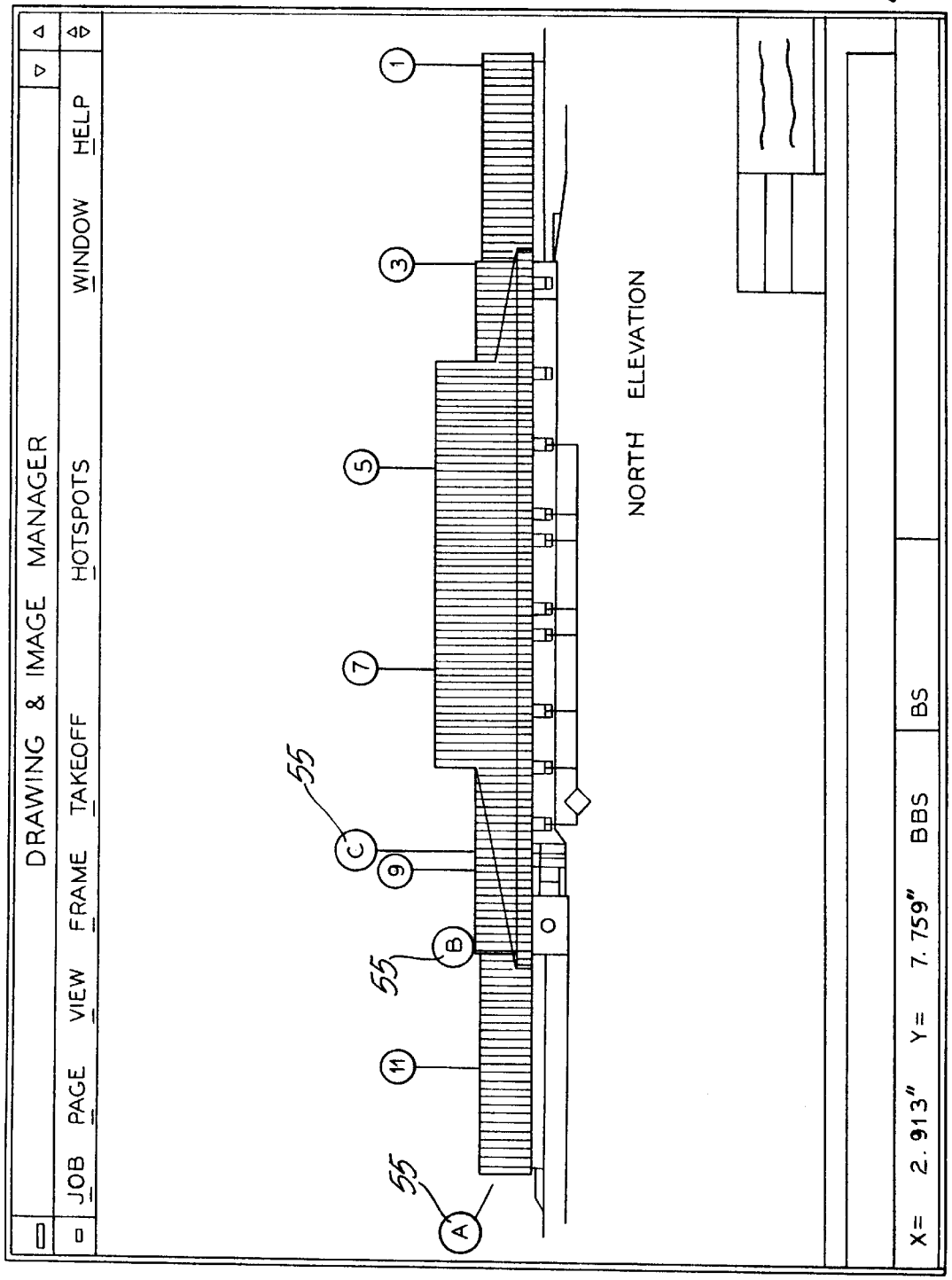
FIG. 4 illustrates the display of a primary document with hotspots.

As an example of the system, an elevational view is illustrated in FIGS. 4–5 as displayed on the display 14 with the function bar therealong. This may be considered the primary document which includes a north elevation view. Located on these drawings are four hotspots: A, B, C, and numbered hotspots. The "A" hotspot will call up a textual description which is in a note or text file named A in memory 30 as illustrated in FIG. 5. Subsequent activation of the hotspot "B" will call up the B file and display same in a cascade fashion on the computer screen as in FIG. 5. The B file may be a sectional view as is illustrated. Thereafter, each of these documents may be exited in order to return and display the full primary document as in FIG. 4.

FIG. 6 illustrates the designation and blocking of a frame 36 from a secondary document.

Figure 2:
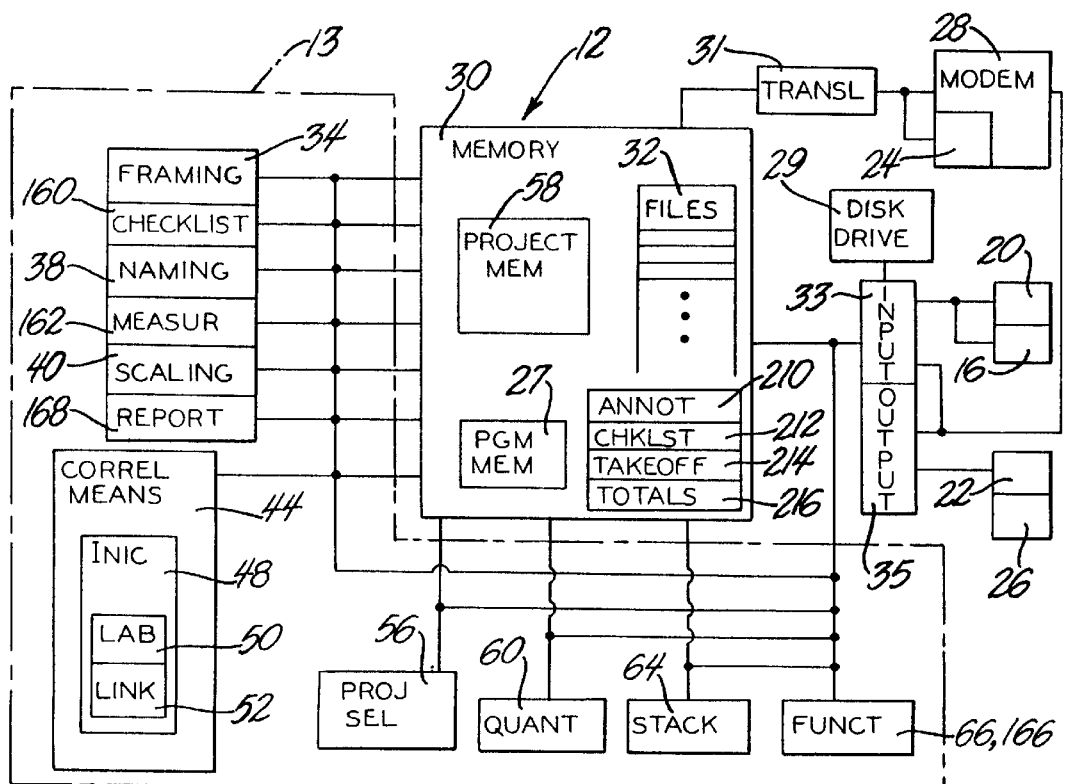
FIG. 2 is a block diagram of the controller of the subject invention.
Figure 7:
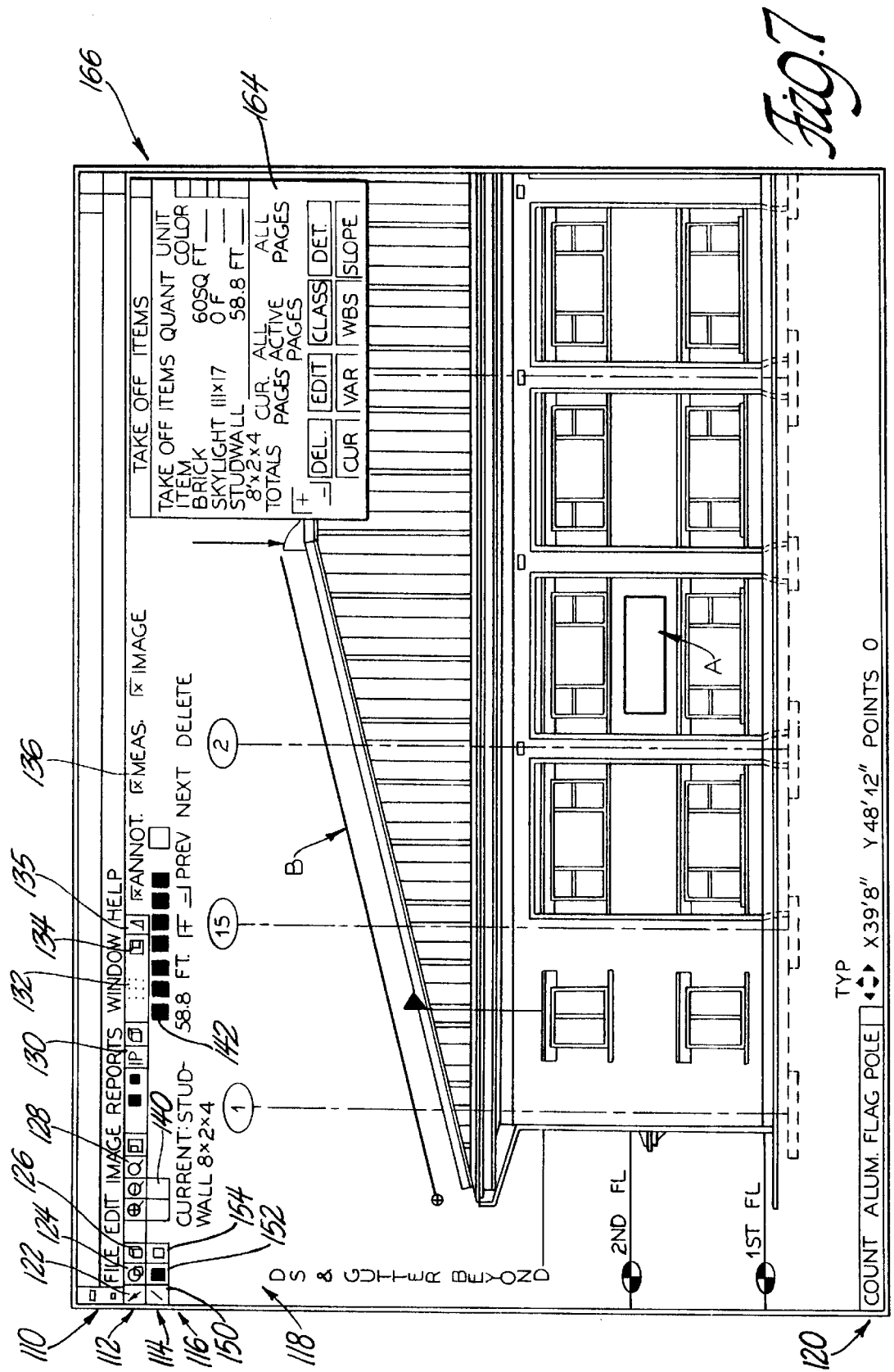
FIG. 7 illustrates the display of a second embodiment of the invention.

FIG. 7 illustrates an alternative function means 166 including function names and format slightly different from the original disclosed system 10, however, functions are very similar except those specifically identified. The apparatus illustrated in FIGS. 1 and 2 is the same for this embodiment, with additional means indicated by three digit reference numerals in FIG. 2.

The computer display 14 includes a main menu 110, main button bar 112, and secondary button bar 114 comprising the function means 166, and also includes an item information line 116, file area 118, and position information line 120. The main menu 110 is similar to Windows™ programs, and contains commands which drive the subject system 10, as commonly known in the art in Windows™. The main button bar 112 displays buttons used to perform various commands and can be divided by function buttons 122–126, zoom button 128, information window buttons 130, grid buttons 132, view window buttons 133–135, view modification options 136.

The function buttons 122–126 include "pointing and selection" 122, "annotations" 124, and "measurements" 126 and change the secondary button bar 114 accordingly. The zoom buttons 128 change the view window of the current image displayed using the various zoom buttons as in the first embodiment, i.e., zoom in on an image to see finer detail up close or zoom out to see a more general picture, as commonly known in the art and previously disclosed. The information window button 130 allows viewing of other information, such as specifications, project notes, project information. The grid button 132 allows the user to place a grid on the current image for take off or measurement purposes. The view window buttons 134–135 display the "pan window" and the "close-up window". The view modification options 136 give the user the option to view various aspects of the images being displayed, i.e., image, annotations, measurements.

The secondary button bar 114 will be either not displayed, displaying annotation options, or displaying measurement/take off options dependent on the function 124–126 selected on the main button bar 112. The secondary button bar 114 includes function options 140 and color options 142 to allow the user to choose what type of annotation or measurement to be drawn and in the proper color. The item measurement information line 116 displays information while in measuring mode to assist in performing take off. The file area 118 is the area where the actual file or building drawings are displayed. The position information line 120 displays the current x, y coordinates and the number of points and item/product during take off.

Figure 8:
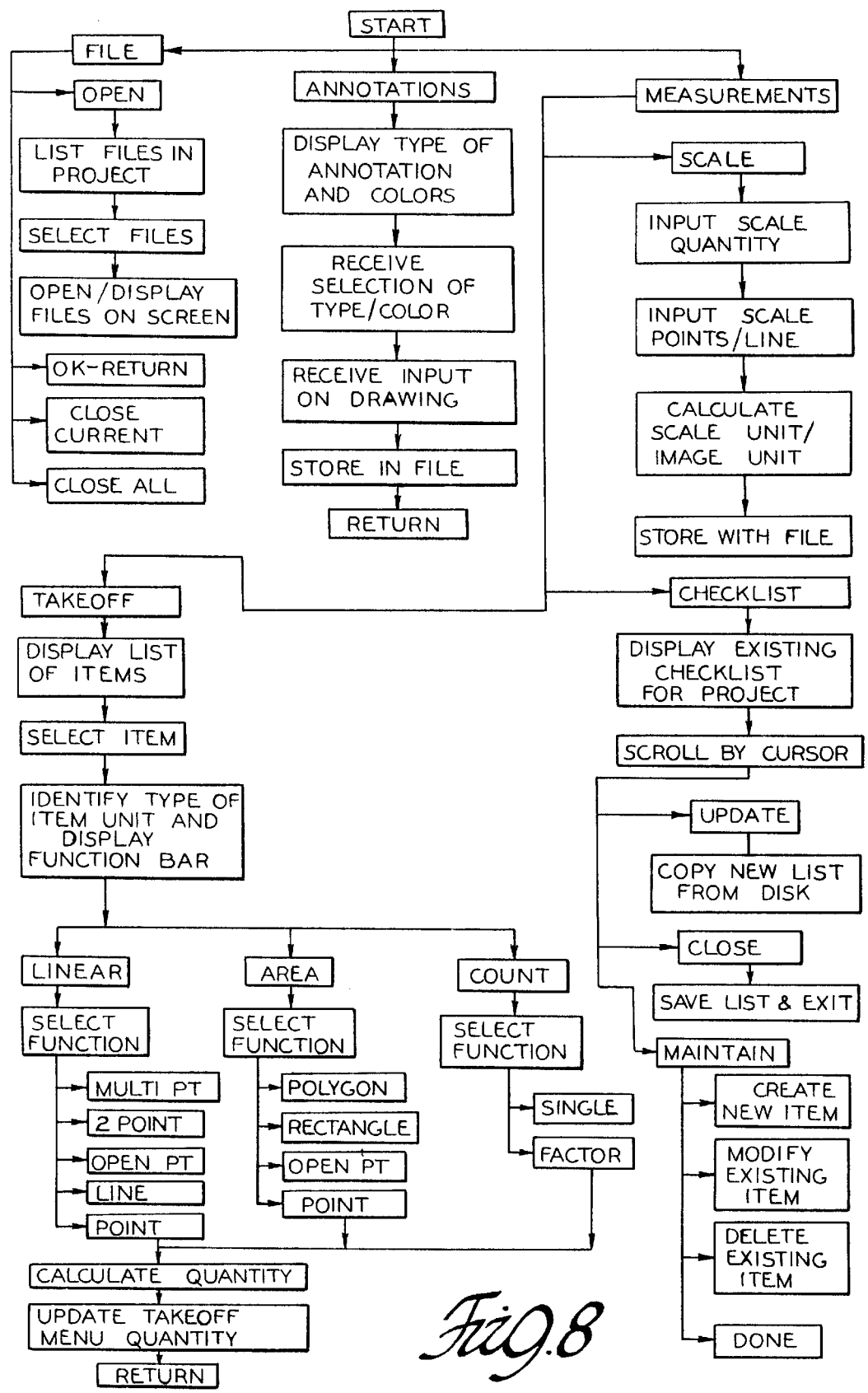
FIG. 8 illustrates the flowchart for modified functions of the second embodiment.

FIG. 8 illustrates a flowchart of a portion of functions of the second embodiment relevant to the invention, and as they differ from the first embodiment. Once a project file (a list of all building drawings and related files for particular job or project) has been selected (by project means 56), a specific image file may be opened by first selecting the FILE command from the main menu 110, and then selecting an OPEN command from the resulting pull down menu. A dialog or menu box appears which includes a listing of the file names, description and any other information relating to files stored with the project. Such information may be as follows.

| IMAGE OPEN | | | | |
|---|---|---|---|---|
| Page Name | Description | M | A | |
| New Blank Page | | | | ↑ |
| 93316-01.tif | | Y | Y | OK |
| 93316-21.tif | | | | |
| 93316-28.tif | | | | |
| 93316-31.tif | | | | CANCEL |
| mb-k2sec.dxf | | | | |
| mb-nisa.dxf | | | | |
| mb-tsec.dxf | | | | |
| mb-w2iso.dxf | | | | ↓ |
| File Types | | | | |
| *.* | ↓ | | | |

This is equivalent to the JOB function and OPEN command of FIG. 3a. The dialog box contains a list of all images files which can be opened for the selected project. In general, the dialog or menu boxes as described herein are displayed in the file area 118 over any other files or images displayed therein. Once action is taken the box is removed from display, as commonly known in the art. The dialog box may include an upper arrow function and a lower arrow function to allow a user to scroll through all of the files appearing in the memory 32, 58. One or more images are selected for viewing by the cursor being placed on the file name and the mouse clicked. Various techniques for selection may be implemented as desired and well understood by those skilled in the art. The image file is then displayed within the page client area 118. Multiple images may be displayed as desired, i.e., cascade, tile, etc. The existence of measurement (M) and annotations (A) in a file may also be indicated.

An image may be closed as previously discussed. In the subject embodiment, the FILE button is depressed on the main menu 110 and the "close current page" option selected from a pull down menu. This will close the current file and make the next available file as a "current page" if there are more files in the file area 18. The pull down menu also includes "close all open pages" selection which will close all the pages open in the file area 118. The files are stored in the file memory 32 with any changes or additions thereto.

Common Windows™ function commands may resize and move images about the file area 118 and utilize the tiling and cascading as known in the art. Generally, each image file will display the name thereof, as illustrated in FIG. 7. The "current page" is normally the page on which an action was most recently been taken.

In the subject embodiment, the zoom functions 128 are displayed on the main button bar 112 and include the function of: zoom in button, zoom out button, etc. as in the previous embodiment and commonly known in the art.

The view buttons 134–135 includes the pan window is a small window generally located at the side of the main image which always displays a full view of the current image file, regardless of the view on the main image, i.e., if zoomed. Both the main image and pan window can be viewed for comparison. The closeup window performs the opposite function of the pan window. The closeup window in a similar manner displays a very close view, usually of the area in which the mouse pointer currently resides. The closeup window allows for examination of text, dimensions, details, etc. without having to constantly use the power zoom. The pan and closeup windows can be independently displayed, hidden, resized and moved for studying images, performing takeoffs, etc.

The pan and closeup windows can be displayed by pressing the proper buttons 134–135. Once the pan or closeup window is active, it will remain active until closed. Only be one pan or closeup window is active at a time. If the current file is changed to another file on the screen, the pan and closeup windows are immediately updated to reflect the new current image.

The pan window always displays the full view of the image being displayed in the current file. In addition, if the current file is zoomed any closer than a full view, a box will be displayed on the pan window to signify where the view of the current file is displaying.

Selecting an area to zoom using the pan window is as follows. First, the mouse is moved over the pan window. Next, press the left mouse button and drag the mouse pointer the opposite corner of the desired view. Finally, the mouse button released. The image will be automatically zoomed to the chosen view and the boxed region of the pan window will be drawn.

The closeup window includes an options dialog box which determines exactly how often the closeup window is updated. If an update option is set to "automatic", then the closeup window will be updated without any user interaction. If this option is set to "manual", the user must, hold the control button down and press the "S" key. This will update the view displayed in the closeup window.

The magnification level setting determines how magnified the view in the closeup window will be. This setting can be set from 1 to 20.

The update interval determines how fast (in milliseconds) the closeup window will be updated. This option is only useful if the update type is set to "automatic". In automatic up date mode, every time the mouse pointer stops moving for a period of time longer than the update interval, the closeup window is updated. The interval can be set from 100 milliseconds to 1000 milliseconds (one second).

Each of the building construction drawings or images in a file 32 may include information added thereto, such as in the form of annotations. The secondary button bar 114 displays the annotations options (not shown) and is accessed by pressing the ANNOTATIONS button 124 on the main button bar 112. The annotation button bar includes the following function of: rectangles ellipses, circles, freehand, lines, arrows, text, highlighting, sticky notes, along with several different color buttons. Selecting annotations and colors are accomplish by pressing the two buttons, one a function and one of color. Annotations are commonly known in the art and may be stored with the associated file in an annotation file 210, which may be selectively displayed with the drawing file.

Each of the drawings or images in files 32 may include measurements of dimensions made thereon by actuating the MEASUREMENT button 126, which then displays the secondary button bar 114. The secondary bar 114 (in measurement mode) includes the following buttons: SCALE function 150, CHECKLIST function 152, TAKE OFF function 154, and the five different measurement options 140 along with several different color options 142, as indicated in FIG. 7. Similar to annotations, the measurement colors are selected by pressing a single color button 142 and any measurement will be ran in the selected color. The take off types are linear (perimeter, rectangle and line segments) and area and count items (linear is illustrated in FIG. 7).

In order to measure a distance on a drawing or image, the image file must first be scaled or calibrated by the scale means 40. The SCALE function defines a dimension on the image and stores the distance between the two points with the image file. The SCALE function is accessed from the secondary button bar 114 (measurement mode) by depressing the SCALE button 150 to pull up the following information.

| SCALE | | | |
|---|---|---|---|
| 34 ft 6 in | | | |
| 7 | 8 | 9 | System |
| 4 | 5 | 6 | x English |
| 1 | 2 | 3 | _ Metric |
| 0 | . | / | Units |
| C | | <= | _ Feet |
| | | | x Inches |
| SAVE | | | DONE |

The scale window includes an input display area (dimensions and units), number input buttons (←) (keypad), clear button (C), backspace button(¢), system selection buttons (English, Metric), and unit selection. The input display area enters the scale quantity input by the use using the number input buttons and the unit selection. The scale quantity is the true or real world, building or component dimension represented in drawing. The clear button (C) clears the input display area so the user can reenter. The backspace button backs off the last entry made to the input display area.

Once the scale quantity has been entered, a scale line is drawn on the image to represent the scale quantity. Clicking on two scale points with the left mouse will cause the scale line to be drawn therebetween. Once the scale quantity and scale line have been satisfactory entered, the SAVE button saves the scale quantity and scale line in the image file in memory 32. The DONE button will close the scale window. Any subsequent use of the image file will automatically have the scale associated therewith.

The scale associates the true or full scale dimension indicated on the drawing to actual display size, or image units. The pixel area is defined for the scale line. From this information, true dimensions and areas during TAKE OFF on the image may be determined from the representative displayed image. The scale utilizes predefined image unit dimensions and pixel areas stored within the scale program. For example, a blueprint file may be scanned at 200 dots per inch, around 10,000 image units long and 9,000 image units wide. To determine the length and width of the window that the image will be displayed in the file area 118, the number is determined by pixels. For example, a window on a 640×480 VGA screen must be 300 pixels long and 200 pixels wide. The difference between the two scale points entered by the user in the horizontal direction is used to determine the length per pixel in the selected units. Likewise, the difference between the two scale points in the vertical direction is then used to determine the width per pixel. This quantity is used to determine the length per image unit or the drawing scale. For example, the user entered the scale line where point 1 is at pixel (20, 50) and point 2 is at pixel (140, 70). The difference in the x direction between the two points is 120 pixels. Using the equation $a^2+b^2=c^2$, the length, in screen pixels, of the line can be determined. In this case, $(140-20)^2+(70-50)^2=14,800$. Taking the square root of 14,800, the scale line is determined to be 121.655 pixels in length. If the user input the scale dimension of 100 feet in length, a ratio of feet to pixels can be determined. In other words, the number of feet per pixels equals 100/121.655 or 0.08219 feet per pixel. The last step is to determine the number of feet per image unit. If the image is 10,000 image units in length and display window is 300 pixels in length and there are 0.03 pixels per image unit. The number of feet per image unit can then be determined by the following: 0.8219/pixel×0.03 pixel/image unit=0.0246 feet/image unit. This is the scale for the drawing.

Once the user defines the drawing scale, the length between any two points on the drawing can be determined. Also, the coordinates in the position information line 120 are updated every time the cursor moves over the current page. Dimensions can be either absolute (measured in relation to a fixed point on the image, such as the lower left corner) or relative (measured in relation to the most recently entered measured point).

The OPTIONS function allows selection of the coordinate types. Upon depression of the OPTION button, a dialog box is displayed including coordinate-type selection for absolute/relative and Cartesian/Polar. One of each selection must be selected, and such selections are saved in memory 32 with the specific image file.

The CHECKLIST function designates the available take off items and dimension type, i.e., linear, area and count items, as follows, upon actuation of the CHECKLIST button 152 through the checklist means 160.

| CHECKLIST | |
|---|---|
| Linear | 2 × 4 × 0' Stud Wall |
| Area | Shag Carpeting |
| Count | Fence Posts |
| Linear | Stone Wall |
| Area | Hardwood Flooring |
| Area | Brick Walkway |
| MAINTAIN | UPDATE    CLOSE |

The highlighted item is considered the "current checklist item", and may be selected by cursor movement. The UPDATE button will read the checklist from a disk. When this button is clicked, the system 10 will search the main directly of the project for a file called "Chcklist.dat" which was previously stored and established. The CLOSE button closes the checklist dialog box. The MAINTAIN button displays a dialog box used to maintain (create, modify, and delete) checklist items. The checklist MAINTAIN box may appear as follows:

| CHECKLIST MAINTENANCE | | | |
|---|---|---|---|
| Name | | Unit | |
| 2 × 4 × 8' | Stud Wall | Feet | ↓ |
| Variables | Name | Unit | Default Value |
| Var 1 | Height | Feet ↓ | 32 |
| Var 2 | | ↓ | |
| Var 3 | | ↓ | |
| Var 4 | | ↓ | |
| Var 5 | | ↓ | |
| Var 6 | | ↓ | |
| Var 7 | | ↓ | |
| Var 8 | | ↓ | |
| PREV    NEXT    SAVE    DELETE    NEW    DONE | | | |

The current checklist item information is displayed with the unit. By actuating the arrow adjacent the unit, the various units are scrolled for modification, i.e., feet, meters, square inches, etc. Variables are associated with a given checklist item, i.e., up to eight variables per checklist item. This information can be used during estimation of quantity and price. These variables include information or dimension not indicated in the drawing, but necessary in determining final quantity requirements. The PREVIOUS and NEXT buttons are actuated to move or scroll through the checklist items sequentially. The SAVE buttons saves the information currently displayed in the dialog box. The DELETE button deletes the currently displayed checklist items. The NEW button creates a new checklist item. The CLOSE button closes the checklist maintenance dialog box. The checklist file is stored in a checklist file 212 and is associated with the specific image file.

Measurement means 162 allows measurements of any dimensions on the drawing, similar to the quantitative means 60 of the first embodiment. When the TAKE OFF button 154 is activated, the checklist take off items that can be measured are displayed for the current project (see FIG. 7). The list is copied from the checklist file 212. An item can be listed multiple times. The take off item quantity is incremented as measurements are preformed on the images and decremented when measurements are deleted. The take off item color is displayed when measurements are drawn on the images. When measurements are preformed, the highlighted take off item will be the measured amount calculated and incremented. The take off window 164 (FIG. 7) has several buttons including: ± (increment/decrement) buttons, DELETE button, EDIT button, CLOSE button, DETAIL button. The ± buttons are used to set the sign of measurements performed, i.e., added to or deducted from the total take off quantity based on the sign of the button pressed. The DELETE take off button will delete the current take off item from the take off list and delete all take offs of this type from all files of the current project. The EDIT take off name button allows the take off item to be edited, though any changes are not reflected in the checklist item. The CLOSE button closes the take off window. The DETAIL button expands the take off window to display additional selected information. The DETAIL button may be actuated to selectively display additional information during take off, such as: item number in the checklist file, item type (area, count, line), highlight only current items or all in display, display variables for the current item, display text information for each take off item, determine slope of lines in take off.

The TOTALS selections line allows the user to select: the total quantities only as they relate to the current image file, all opened image files, or all files for a project.

There are three dimension types used in take off including area, length, and count, which is designated by the current take off item from the checklist. Areas include different measure button bars than linear and than count (the measure bar 140 for linear is displayed in FIG. 7).

The "area" dimension types will display function buttons of: polygon, rectangle, box. The area (polygon) button allows a user to click with the left mouse button as many times desired on various points to create a complex shape and close the polygon by pressing the right button. The area is calculated utilizing the scale and the total is added to the measurement total in the take off window. The area (rectangle) allows creation of rectangles by clicking on a starting corner and dragging the mouse pointer over the selected area. When the left mouse button is released, the total area is calculated and added to the measurement total in the take off window (see FIG. 7 at A). The area (point) represents a predetermined amount input by the user, and each click with the left mouse button places a small square on the page, and adds the predetermined amount to the total for current take off items. The predetermined amount quantity is entered in the item information area 116. Multiple points may be clicked on an image.

The linear (multi point) measurement is similar to the area (polygon) type. After pressing this button, single clicking with the left mouse will drawn a polygon, which is closed by clicking the right mouse button, and a linear or perimeter measurement is calculated. Linear (2 point) button creates a rectangle established between the two points, which may be dragged across the screen. The length of the sides of the rectangle are then added to the total take off. The linear (open point) is similar to the polygon, but when the right mouse button is pressed the shape is not closed. The linear (line) button is used to draw lines between two points. After pressing the button, lines are drawn by clicking two times with the left mouse at two different points and the quantity is added to take off total. The linear (point) button allows the user to draw points which represents desired quantities (see FIG. 7 at B). This function is similar to the area (point) dimensions. The quantity for the points is entered then the left mouse button is pressed at the desired point and small boxes are drawn where the mouse button was clicked and the quantity is added to the total take off.

The count measurement button increments the current take off item quantity by one each time the user presses the left mouse button on the current page. A factor may be entered, i.e., 10, so that the total count is multiplied by the factor.

To determine measurements, the measurement means 162 utilizes the scale. For example, if a user draws point 1 at pixel (100, 130) and point 2 at pixel (150, 100) then the same positions and image units can be determined. If the window is 200 pixels in length and 160 pixels in width, and the image is 10,000 image units in length and 9,000 image units in width, then the number of image units (iu) per pixel in the x direction equals 10,000/200=50 iu/pixel and in the y direction 9,000/160=56.25 iu/pixel. The point 1 image unit position can be found:

x direction: 100 pixels×d image units/pixels=image unit 5,000 y direction: 130 pixels×56.25 image units/pixel=image unit 7312.5.

Point 2 can be found in the same way to be at image unit (70, 500, 5625). The absolute value of the image-unit difference between the two points in the x and y direction is (2,500, 1687.5). Using the $a^2+b^2=c^2$ formula, the image unit length of the line is the square root of 3016.232 image units. The real world length of the line can then be found by multiplying by the drawing scale (0.0246 feet/image unit) by the length in image units (3016.232). The length of the line is then 74.199 feet. The area and length measurements may then be determined based on the length of each line drawn (each point), and known equations of area and length may be used to obtain total measurements from the line lengths.

If the specific measurement points are not fully placed for any dimension type, the most recent point can be UNDONE by pressing the BACKSPACE key. This will delete the most recent point and decrement the point count. Pressing the BACKSPACE key again will delete the next most recently point. The points can be reentered. The entire measurement can be "undone" by pressing the ESCAPE key if the full measurement has not been completed, i.e., all necessary points or mouse actions implemented. This will take all points of the measurement off the screen so the user can start the takeoff completely over. The DELETE buttons will cause the current measurement to be deleted. If there are more measurements on the current page, then the current measurement will be set to the next available measurement.

An additional function may be included as AUTO TRACE and includes a function button on the computer screen therefore or a selection in the takeoff. The AUTO TRACE function automatically draws a line about a certain item type on a blueprint image or a graphical representation of a CAD file to allow automatic takeoffs and calculations based thereon. For example, the auto trace may-be selected and an item type is selects such as "roof". The function will allow the program to outline the roof areas on the drawing automatically and obtain the quantity based thereon. The function discerns areas of a drawing belonging to the selected item type. The AUTO TRACE function includes specific industry rules to include necessary characteristics pertaining to the selected item, i.e. roofing—added material for the slope and shape analysis for determining the eave/gutter, ridge and gable materials of roof. A special takeoff window allows users to define rules for auto-takeoff items based on shape analysis, pattern recognition, character recognition, formulas and related component data tables to create custom auto takeoff items. The function operates to automatically draw a line about a certain item type to allow automatic takeoff and calculations based thereon.

The graphic measurement lines and points and color drawn during take off are stored in take off memory 214 so that such lines may selectively be displayed or not (selected by 136). All the product items and quantities and associated measurement lines are stored in totals memory 216. Any time further measurements or takeoffs are conducted, this file will be references and updated.

Two methods allow making measurements to be more accurate. These methods are Near-Point Snaps and Snap To grid. By holding the shift key down while pressing performing a takeoff, this embodiment will look for the nearest pixel point of an existing take off line, and use that point as the newly measurement point. For example, if one area has been drawn on the image, and a second area is desired which shares corner points with the first area, while drawing the second area, the "shift" key is held down and press the left mouse button near the shared points. The point that is actually drawn as a result of this operation will be on top of the point nearest the mouse pointer at the time of the mouse click.

The "Grid" is a set of horizontal and vertical lines either drawn or implied on a image, which the mouse pointer uses as a guideline in drawing measurements. While the grid is on, any measurement point entered will actually be "snapped" to the nearest grid crossing. This provides for rounding of measurement points to the nearest foot, inch, meter, etc. Creating a grid on the current page is accomplished through the GRID button 132. Upon actuation of the GRID button 132, a Grid Size display shows the current grid setting. "Feet" and "Inches" are displayed in the grid display window as well as the numbers. The Grid Number buttons are pressed to place the quantities in the grid size display. Decimal numbers and fractions can be entered as well as whole numbers. The Clear Grid Size Display button clears out all information currently in the grid size display. This button can be pressed to start the grid size entry over. The feet and inches buttons are used to place feet and inches signifiers in the grid size display. The Backspace key is pressed to undo the most recently entered element on the grid size display. If the grid size display read "6 ft 3 in", pressing the backspace would leave "6 ft 3". Pressing the backspace again would leave "6 ft". The Grid On Option is used to determine whether or not the mouse pointer should respect the grid. A grid can be entered, but left off for future reference. The grid can also be turned on and off at will by clicking on this option. The Show Lines Option determines whether or not the grid lines should be shown on the page. If this option is checked, then the grid can still be on and the mouse pointer will respect the grid lines. The lines will not show, however. It the Grid On Option is not checked, then this option is not available.

The embodiment contains a simple reporting system. The reporting system allows the user to print several reports with varying degrees of detail through report means 168. To access the Reports screen, select the "Reports" button on the main menu 110. The Reports screen will appear. The Report List displays the names of the reports which can be printed. A report type is selected by single clicking on the name with the left mouse button. The Report Destination indicates to send the report to the printer, a designated report file, or the screen. Reports sent to the screen can be viewed and scrolled. The report can be based on the measurements of the current page, all the pages currently loaded, or all pages within the current project. Pressing the "send" button sends the report to its destination. For example, the following represents typical report information:

C:\PROJECT\CIT.FLD\PLANS.DOC\REPORT.004

Detail TakeOff Report
for
X
Thursday, October 13, 199
05:00

| File Name | File Description | TakeOff Item | QuantityUnit |
|---|---|---|---|
| city005 | roof plan | Roof Panel | 72045.19SqFt |
| | | Roof Panel | 67145.99SqFt |
| | | Roof Panel | 66980.34SqFt |
| | | Roof Panel | 31136.20SqFt |
| | | Roof Panel | 31856.62SqFt |
| | | Roof Panel | 17623.38SqFt |
| | | Roof Panel | 31724.01SqFt |
| | | Roof Panel | 35154.35SqFt |
| | | Roof Panel | 21962.29SqFt |
| | | Roof Panel | 26474.45SqFt |
| | | ridge cap | 67.55Feet |
| | | ridge cap | 27.59Feet |
| | | ridge cap | 170.01Feet |
| | | : | : |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A method for manipulating a construction drawing comprising the steps of:
   a. storing in electronic form in a memory means an image of a construction drawing in a page file;
   b. assigning a first measurement scale to the image in the page file including storing a first measurement scale quantity representing the full scale dimension between two selected scale points on the image;
   c. displaying the image of the construction drawing in the page file on a video display means;
   d. blocking a selected portion of the image of the construction drawing;
   e. storing in electronic form in the memory means an image of the blocked portion of the construction drawing in a frame file;
   f. assigning a second measurement scale to the image in the frame file; and
   g. displaying the image of the blocked portion of the construction drawing in the frame file on the video display means independently of the image of the construction drawing in the page file.

2. The method of claim 1, wherein step b. is performed prior to step a.

3. The method of claim 1, wherein step b. is performed subsequent to step a.

4. The method of claim 1, wherein steps e. is performed subsequent to step f.

5. The method of claim 1, wherein step f. is performed subsequent to step e.

6. The method of claim 1, wherein step f. includes storing a second measurement scale quantity representing the full scale dimension between two selected scale points on the image in the frame file.

7. A method for manipulating a construction drawing comprising the steps of:

a. storing in electronic form in a memory means an image of a first construction drawing in a first page file;

b. assigning a first measurement scale to the image in the first page file including storing a first measurement scale quantity representing a full scale dimension between two selected scale points on the image;

c. storing in electronic form in a memory means an image of a second construction drawing in a second page file, the second construction drawing being related to the first construction drawing;

d. assigning a second measurement scale to the image in the second page file;

e. displaying the image of the first construction drawing in the first page file on a video display means;

f. placing a hotspot reference indicator at a selected location in the image of the first construction drawing; and g. linking the hotspot reference indicator to the second construction drawing whereby when the hotspot reference indicator is activated, the image of the second construction drawing is displayed on the video display means.

8. The method of claim 7, wherein steps a. is performed subsequent to step b.

9. The method of claim 7, wherein step b. is performed subsequent to step a.

10. The method of claim 7, wherein step c. is performed subsequent to step d.

11. The method of claim 7, wherein step d. is performed subsequent to step c.

12. The method of claim 7, wherein step d. includes storing a second measurement scale quantity representing the full scale dimension between two selected scale points on the image in the second page file.

* * * * *